(12) United States Patent
Allen et al.

(10) Patent No.: US 8,756,672 B1
(45) Date of Patent: Jun. 17, 2014

(54) AUTHENTICATION USING MULTI-LAYERED GRAPHICAL PASSWORDS

(75) Inventors: Jeffrey L. Allen, Naperville, IL (US); Rory L. Block, Washoe Valley, NV (US); Douglas B. Childs, Reno, NV (US)

(73) Assignee: WMS Gaming, Inc., Waukegan, IL (US)

( * ) Notice: Subject to any disclaimer, the term of this patent is extended or adjusted under 35 U.S.C. 154(b) by 105 days.

(21) Appl. No.: 13/280,992

(22) Filed: Oct. 25, 2011

Related U.S. Application Data

(60) Provisional application No. 61/406,387, filed on Oct. 25, 2010.

(51) Int. Cl.
*G06F 21/00* (2013.01)

(52) U.S. Cl.
USPC ......... 726/7; 726/2; 726/19; 345/173; 463/29

(58) Field of Classification Search
USPC ................................................ 726/7; 463/29
See application file for complete search history.

(56) References Cited

U.S. PATENT DOCUMENTS

| 7,502,934 B2 * | 3/2009 | Dietl ............................ 713/176 |
| 2003/0093699 A1 | 5/2003 | Banning et al. |
| 2004/0230843 A1 | 11/2004 | Jansen |
| 2004/0250138 A1 | 12/2004 | Schneider |
| 2004/0260955 A1 | 12/2004 | Mantyla |
| 2006/0174339 A1 | 8/2006 | Tao |
| 2006/0206918 A1 | 9/2006 | McLean |
| 2006/0288231 A1 * | 12/2006 | Kim et al. ..................... 713/184 |
| 2007/0277224 A1 | 11/2007 | Osborn et al. |
| 2008/0214298 A1 * | 9/2008 | Byng .............................. 463/29 |
| 2008/0235788 A1 | 9/2008 | El Saddik et al. |
| 2008/0244700 A1 | 10/2008 | Osborn et al. |
| 2010/0180336 A1 | 7/2010 | Jones et al. |
| 2010/0186074 A1 | 7/2010 | Stavrou et al. |
| 2010/0322485 A1 * | 12/2010 | Riddiford ..................... 382/115 |
| 2012/0159592 A1 * | 6/2012 | Griffin et al. ..................... 726/7 |

OTHER PUBLICATIONS

"Picture Password: A Visual Login Technique for Mobile Devices"; Jansen et al; National Institute of Standards and Technology, NISTIR 7030, Jul. 2003.*

* cited by examiner

*Primary Examiner* — Taghi T Arani
*Assistant Examiner* — Jason Lee
(74) *Attorney, Agent, or Firm* — DeLizio Gilliam, PLLC

(57) ABSTRACT

In some embodiments, a computerized method includes presenting multiple choices for attributes of a multi-layered graphical password, wherein each of the attributes is associated with one of a plurality of layers of the multi-layered graphical password. The multi-layered graphical password is for use in accessing a system. The method includes receiving selections from among the multiple choices, wherein the selections identify a group of the attributes of the multi-layered graphical password. The selections are associated with a user attempting access to the system. The method includes authenticating the user based on the group of the attributes of the multi-layered graphical password. The method also includes allowing the user access to the system.

16 Claims, 7 Drawing Sheets

AUTHENTICATION USING MULTI-LAYERED GRAPHICAL PASSWORDS

RELATED APPLICATIONS

This application claims the priority benefit of U.S. Provisional Application Ser. No. 61/406,387 filed Oct. 25, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2010, WMS Gaming, Inc.

FIELD

Embodiments of the inventive subject matter relate generally to user authentication, and more particularly to user authentication that includes graphical passwords.

BACKGROUND

User authentication is important in a number of applications and systems. The security and integrity of applications and systems that allow access by a number of users is highly dependent on user authentication. User authentication generally requires users to input a username and password. In response to the correct username and password, a user is typically given some type of access to the applications or systems.

BRIEF DESCRIPTION OF THE FIGURES

Embodiments of the invention are illustrated in the Figures of the accompanying drawings in which.

DESCRIPTION OF THE EMBODIMENTS

Figure 1:
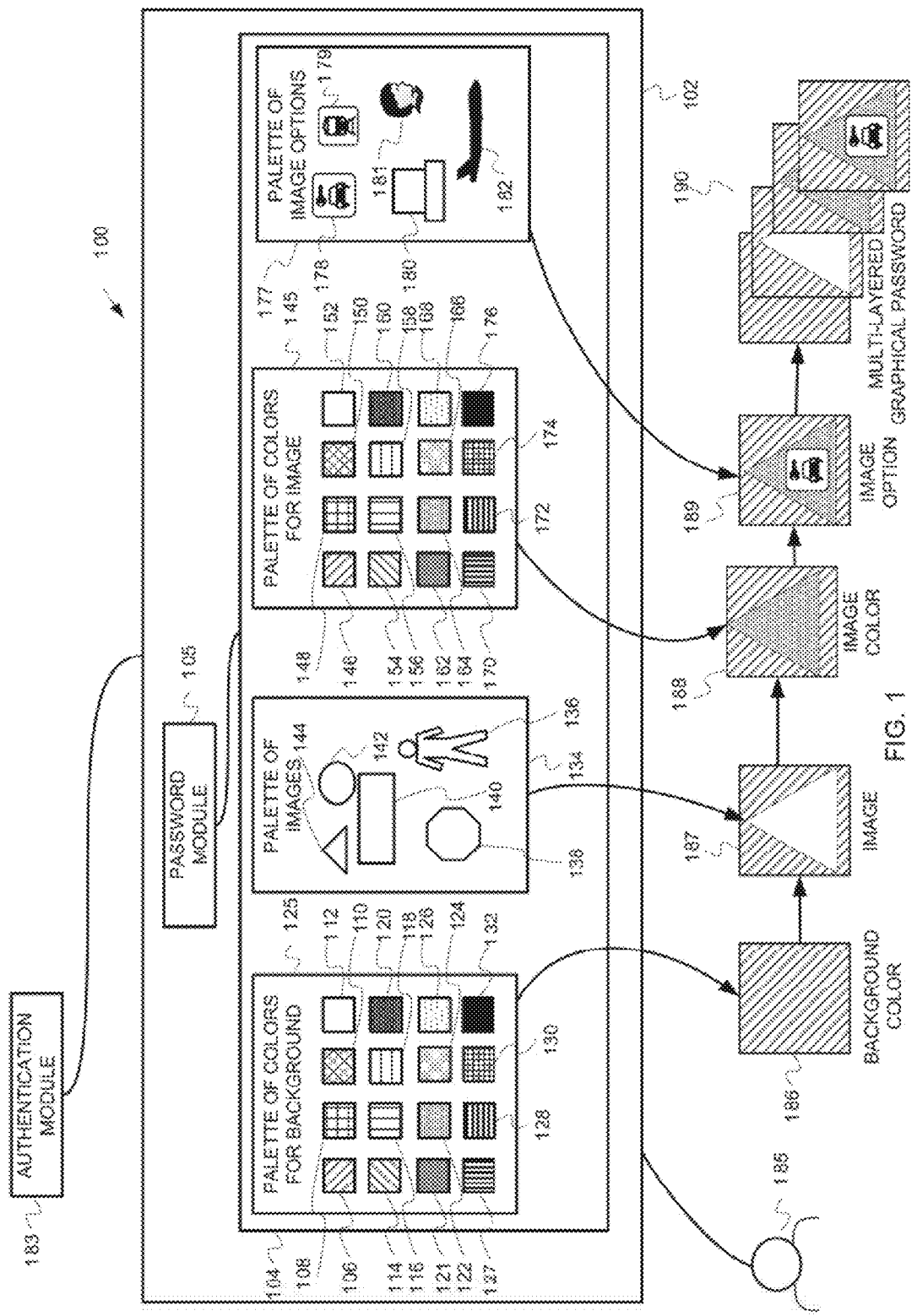
FIG. 1 is a block diagram illustrating a system having multi-layered graphical passwords, according to some example embodiments.

This description of the embodiments is divided into five sections. The first section provides an introduction to some example embodiments, while the second section describes an example operating environment. The third section describes example operations performed by some example embodiments. The fourth section provides example applications for incorporating a multi-layered graphical password into a wagering game environment. The fifth section presents some general comments.

Introduction

This section provides an introduction to some example embodiments. Some example embodiments authenticate users with multi-layered graphical passwords. Some example embodiments are in contrast to traditional user authentication techniques including a 10-key input pad or keyboard for inputting alphanumeric characters for the password, a physical card that comprises a magnetic strip with encoded data, etc.

In some example embodiments, a user interactively builds a multi-layered graphical password to authenticate the user. The graphical password is comprised of multiple layers. For each layer, the user selects from among a multiple of choices regarding a given attribute. For example, a first layer can be the attribute for the background color and/or pattern for the graphical password. A second layer can be the attribute for one or more images for the graphical password. A third layer can be the attribute for the color and/or pattern for the selected images for graphical password. A fourth layer can be the attribute for an image option for the selected images for the graphical password (e.g., specific type of wheels for an automobile image). These different layers (defining different attributes and created by a user) are combined to create the multi-layered graphical password. This multi-layered graphical password can then be used to authenticate the user.

For a given layer, the user can be presented with the multiple of choices on a palette. For example, for the background color, the palette comprises a multiple of different choices (e.g., red, yellow, blue, brown, etc.). In some examples, the images and the image options can be wire diagrams of different objects (automobiles, houses, airplanes, etc.), bitmap images (e.g., Graphical Interchange Format (GIF) images, Joint Photographic Experts Group (JPEG) images, etc.).

Accordingly, a user password is a series of attributes in different layers that creates one image. The combination of these selections in the different layers creates the user password. Some example embodiments are configured to preclude or at least hinder shoulder surfing, wherein another person may attempt to steal the multi-layered graphical password while viewing over the shoulder of the user that is creating the password. For example in some example embodiments to increase security, each time the palette is presented for user selection the multiple of choices are randomly ordered. Therefore, the choices can be at different locations on the palette each time the palette is presented. Thus, the user will be selecting different locations on the palette to create the password for different login sessions. Alternatively or in addition, the order of the palettes presented to the user can also change. In some example embodiments, the order of the palettes can also be randomized. For example for a first login session, the order of the palettes for the different layers is a background color, an image, an image color, and an image option. For a second login session, the order of the palettes would be an image, an image color, a background color, and an image option.

Some example embodiments can be easier for some persons to login into their account. For example, some conventional systems use a virtual keyboard displayed on a screen that can be difficult because all of the different keys on the interface. Also in comparison to conventional password inputs, some example embodiments can be quicker, as there can be less inputs (depending on the number of layers) versus a large numbered alphanumeric password entered using some virtual keyboard on a screen. Some example embodiments are easily scalable to increase security by adding more layers. For example, the multi-layered graphical password can include multiple colors and/or patterns for the background and/or image, multiple images, multiple image options, etc. Some example embodiments are also scalable to increase security based on the number of choices available on a given palette. Accordingly, the number of choices available on a given palette can increase security while having little impact or burden on the user.

While described as having application for wagering game machines or wagering game environments, some example embodiments are applicable in any type of environment where authentication of users is required (entry into various computer systems or accounts, online account access, access to buildings, Automated Teller Machines (ATMs), mobile devices, etc.).

In some example embodiments, the multi-layered graphical password work across an entire enterprise. To illustrate for a wagering game establishment, the multi-layered graphical password can be used to login to wagering game machines, check-in or check-out of a hotel room, pay a bill at a restaurant or other stores therein, etc. The user can input a password in both mobile and non-mobile devices that are communicatively coupled to a backend server that can perform the authentication (as further described below). For example, a waiter at a restaurant can present a mobile device to the user at their table for payment of the bill. The user can input the multi-layered graphical password at the mobile device. The mobile device can then transmit the password to the backend server for authentication and accounting for payment.

Operating Environment

This section describes an example operating environment and presents structural aspects of some embodiments. FIG. 1 is a block diagram illustrating a system having multi-layered graphical passwords, according to some example embodiments.

FIG. 1 includes a system 100 that includes a computer 102 having a display monitor 104 and a password module 105 that are communicatively coupled together. The system 100 also includes an authentication module 183 that is communicatively coupled to the computer 102. The computer 102 is configured to receive input from a user 185. The user 185 provides input for creation of a multi-layered graphical password 190. The user input is based on selections among multiple choices on multiple palettes, wherein each palette is associated with a layer of the password. In this example, the palettes include a palette of colors for background 104, a palette of images 134, a palette of colors for the image 145 and a palette of image options 177.

Figure 2:
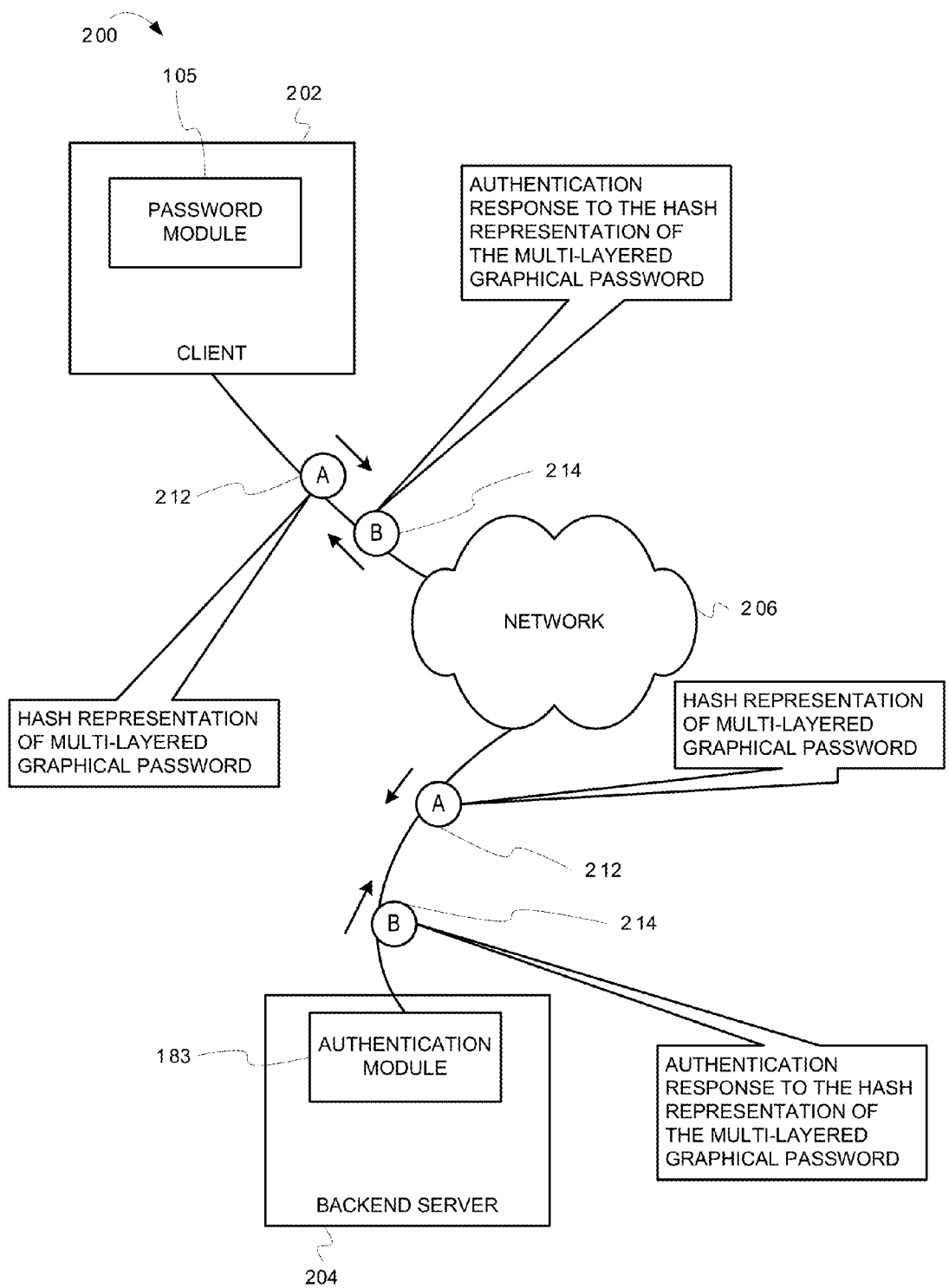
FIG. 2 is a block diagram illustrating a network for authenticating multi-layered graphical passwords, according to some example embodiments.

In this example, the authentication module 183 is external to the computer 102. For example, the authentication module 183 can be executing within a backend server that is coupled to the computer 102 over a network. One example of such a system is illustrated in FIG. 2, described below. In some other example embodiments, the authentication module 183 can be within the computer 102. Accordingly, the creation, receipt, and authentication of the password can be within the computer 102. The password module 105 and the authentication module 183 can be hardware, software, firmware or a combination thereof.

As part of a user login or authentication process, the password module 105 presents the user 185 with the different palettes, wherein each palette is associated with a layer of the multi-layered graphical password 190. In some example embodiments, the password module 105 presents the user with two or more palettes to create a graphical password have at least two layers. In the example of FIG. 1, the password module 105 presents the user 185 with four different palettes—the palette of colors for background 104, the palette of images 134, the palette of colors for the image 145, and the palette of image options 177. Also in the example of FIG. 1, the password module 105 presents the user 185 with all four palettes on the display monitor 104 at a same time. Alternatively, less than all of the palettes can be presented at a same time on the display monitor 104. For example, the password module 105 can present the palettes one at a time. The user 185 can make their selection among the multiple of choices on a palette using a button selection. For example, physical button can be associated with the choices for a palette. Alternatively or in addition, the display monitor 104 can be a touch screen, wherein the user 185 can select a choice by touching the part of the screen displaying their choice. In some example embodiments, the user 185 can also select using a keyboard, mouse, etc.

The palette 125 presents several choices of different colors for the background of the multi-layered graphical password 190 that is being created based on input the user 185. In FIG. 1, different colors are represented by different patterns. The palette 125 includes 16 different colors—colors 106-132. In this example, the user 185 selects the background color 106 that creates a first layer providing the background color—a first layer 186.

The palette 134 presents a multiple of choices of different images for the multi-layered graphical password 190. In this example, the palette 134 presents a number of different wire diagrams of different objects. The objects include a person image 136, an octagon image 138, a rectangle image 140, a circle image 142 and a triangle image 144. In some example embodiments, the images can be also bitmap images (e.g., Graphical Interchange Format (GIF) images, Joint Photographic Experts Group (JPEG) images, etc.), video clips (e.g., Moving Picture Experts Group (MPEG) video, Audio Video Interleave (AVI), etc.). In this example, the user 185 selects the triangle image 144 that creates a second layer providing the image that is on top of the first layer—first and second layers 187.

The palette 145 presents a multiple of choices of different colors for the image of the multi-layered graphical password 190 that is being created based on input from the user 185. In FIG. 1, different colors are represented by different patterns. The palette 145 includes 16 different colors—colors 146-176. In this example, the user 185 selects the image color 164 that creates a third layer providing the image color that is on top of the first and second layers—first, second and third layers 188.

The palette 177 presents a multiple of choices of different image options for the multi-layered graphical password 190 that is being created based on input from the user 185. In this example, the palette 177 presents a number of different image options. The multiple of choices for the image options can be dictated by the image that is selected in the palette 134. For example, if the person image 136 is selected, the image options can include various facial features, clothes, accessories (e.g., purse, glasses, etc.), etc. Accordingly, the password module 105 can populate the palette 177 with the multiple of choices after user selection of the image from the palette 134. The objects include an option for an automobile 178, an option for a train 179, an option for a computer 180, and an option for an airplane 182. In this example, the user 185 selects the option for the automobile 178 that creates a fourth layer providing the image option that is on top of the first, second and third layers—first, second, third and fourth layers that is the final multi-layered graphical password 190.

As the layers are created for the password, the password module 105 can store the selections for each layer in some type of machine-readable storage medium (not shown in FIG. 1). Accordingly, a user password is a series of images in different layers that creates one image. Accordingly, the combination of these selections in the different layers creates the multi-layered graphical password 190.

In some example embodiments, the images and image options can be based on themes. For example, the themes can be automobiles, airplanes, type of plants, celestial bodies, television shows, movies, etc. In some example embodiments, the palettes are configurable by the user 185. For example, the images and image options can be personalized to the user 185. The user 185 can upload one or more images that are part of the choices on the palette. The user 185 can upload these images or image options as part of the initial creation or updating of the multi-layered graphical password 190. As an example, the user 185 can upload images of their family members, pets, etc. (e.g., children, grandchildren, dogs, cats). In some example embodiments, the user 185 can provide all of the images for the choices for a palette of images. Alternatively, the password module 105 can provide other choices relative to the images provided by the user. For example, if the image from the user 185 is of their children, the password module 105 provides images of other children that are choices on the palette 134 for the images. As part of the personalization, the user 185 can input the type of image content (e.g., babies, dogs, cats, etc.) to the password module 105. The password module 105 can then provide other choices from a database of images that can be locally or remotely stored in a machine-readable medium (not shown in FIG. 1).

In some example embodiments, the password module 105 alters the presentation of the palettes to preclude or at least hinder shoulder surfing. For example in some example embodiments, to increase security each time a palette is presented for user selection, the password module 105 changes the order of the multiple of choices. For example, the password module 105 can randomly order the multiple of choices. Therefore, the choices can be at different locations on the palette each time the palette is presented. The password module 105 can change the order of the multiple of choices for any or all of the palettes. Therefore, the user 185 will be selecting different locations on the palette to create the password for different login sessions.

Alternatively or in addition, the password module 105 can change the order of the palettes presented to the user 185. In some example embodiments, the password module 105 can randomly order the presentation of the palettes. For example for FIG. 1, the order of the palettes is the palette 125, the palette 134, the palette 145, and the palette 177. In a different login session, the order of the palettes can change to the palette 134, the palette 177, the palette 125 and the palette 145.

Alternatively or in addition, the password module 105 can change the multiple of choices presented to the user 185. Specifically, instead of presenting the same choices for a given attribute each time, the password module 105 changes what choices are presented. For example, for the palette of images 134, assume that the correct image attribute is the rectangle image 140. In a first login attempt, the password module 105 can present a first set of the multiple of choices (the same ones illustrated in FIG. 1—the person image 136, the octagon image 138, the rectangle image 140, the circle image 142 and the triangle image 144). In a second login attempt, the password module 105 can present a second set of the multiple of choices—the rectangle image 140, an automobile image, a square image, a dog image and a cat image. In some example embodiments, the password module 105 can randomly order the multiple of choices presented to the user 185.

Alternatively or in addition, the password module 105 can change the number of choices presented. With reference to FIG. 1 for the palettes of colors for the background 104, in a first login attempt, the password module 105 can present 16 colors. In a second login attempt, the password module can present 32 colors, etc. In some example embodiments, the password module 105 can randomly order the number of choices presented.

Accordingly, these different options for presentation to preclude or at least hinder shoulder surfing can be practiced together in any combination (e.g., all, selection of two, etc.). In some example embodiments, how these different options for presentation are combined can also change. For example, in a first login session, the order of the palettes and the ordering of the choices in a palette are used to change the presentation relative to a previous login session. In a second login session, the type of choices and the number of choices in a palette are used to change the presentation relative to the first login session. In some example embodiments, how these different options for presentations are combined is random.

Some example embodiments provide authentication from a backend server over a network. In particular, FIG. 2 is a block diagram illustrating a network for authenticating multi-layered graphical passwords, according to some example embodiments. FIG. 2 includes a system 200. The system 200 includes a client 202 and a backend server 204 that are communicatively coupled together through a network 206. The client 202 includes the password module 105. The backend server 204 includes the authentication module 183. In this example, the presenting of the multi-layered graphical passwords and the authenticating of the multi-layered graphical passwords are performed are two different computers that are coupled together over the network.

In some example embodiments, after receiving the selection of the different attributes (e.g., colors, images, etc.) within the different layers of the multi-layered graphical password, the password module 105 converts each attribute into a separate hash. With reference to FIG. 1, the password module 105 creates four different hashes—a hash for background color, a hash for the image, a hash for the image color, and a hash for the image option. In some example embodiments, the password module 105 concatenates the different hashes together to create a single signature for the multi-layered graphical password. In some other example embodiments, the password module 105 can create one hash for all of the different attributes. In some other example embodiments, the password module 105 can create some other type of representation for the different attributes. For example, the representations can be some type of indicator of the user's selection.

In the example of FIG. 2, the password module 105 transmits the hash representation of the multi-layered graphical password 212 over the network 206 to the authentication module 183 on the backend server 204. The authentication module 183 receives the hash representation of the multi-layered graphical password 212. The authentication module 183 then processes the hash representation to determine if the user has provided all of the correct attributes for the multi-layered graphical password (e.g., background color, image, image color, image option, etc.). For a concatenated hash representation, the authentication module 183 can parse out each hash. The authentication module 183 can then compare each hash to a correct hash representation for each attribute. For example, assume the correct multi-layered graphical password for the user 185 comprises a brown background color, with a purple triangle image having an image option that includes a train. The authentication module 183 can store a hash representation for each of these attributes—(background—brown; image—triangle; image color—purple; and image option—train). The authentication module 183 can create and store these correct hashes when a user initially creates or updates their password. The authentication module 183 can then compare these stored hash representations to the parsed out hashes derived from the hash received from the password module 105. If all of the stored hashes equal their respective hashes received from the password module 105, the authentication module 183 defines the user login as valid.

The authentication module 183 then returns an authentication response 214 back to the password module 105 in response to the hash representation of the multi-layered graphical password. For example, the authentication module 183 can send back a Boolean value indicating that the password is either valid or invalid. If valid, the password module 105 can allow the user to login for accessing the system. If invalid, the password module 105 denies the user access to the system.

Example Operations

This section describes operations associated with some example embodiments. In the discussion below, the flowcharts are described with reference to the block diagrams presented above. However, in some example embodiments, the operations can be performed by logic not described in the block diagrams.

In certain embodiments, the operations can be performed by executing instructions residing on machine-readable media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform less than all the operations shown in the flowcharts. This section describes FIGS. 3-4. The discussion of FIG. 3 describes operations for presenting a multiple of choices for each attribute in a layer of a multi-layered graphical password and also for receiving the user's selections for creating the multi-layered graphical password. The discussion of FIG. 4 describes operations for authenticating the multi-layered graphical password. In some example embodiments, these operations in FIGS. 3-4 can be performed by a single module or different modules in a same computer. Alternatively, these operations in FIGS. 3-4 can be performed by different modules on different computers (see the example of FIG. 2 described above). For the description below, the operations of FIG. 3 are performed by the password module 105, and the operations of FIG. 4 are performed by the authentication module 183.

Figure 3:
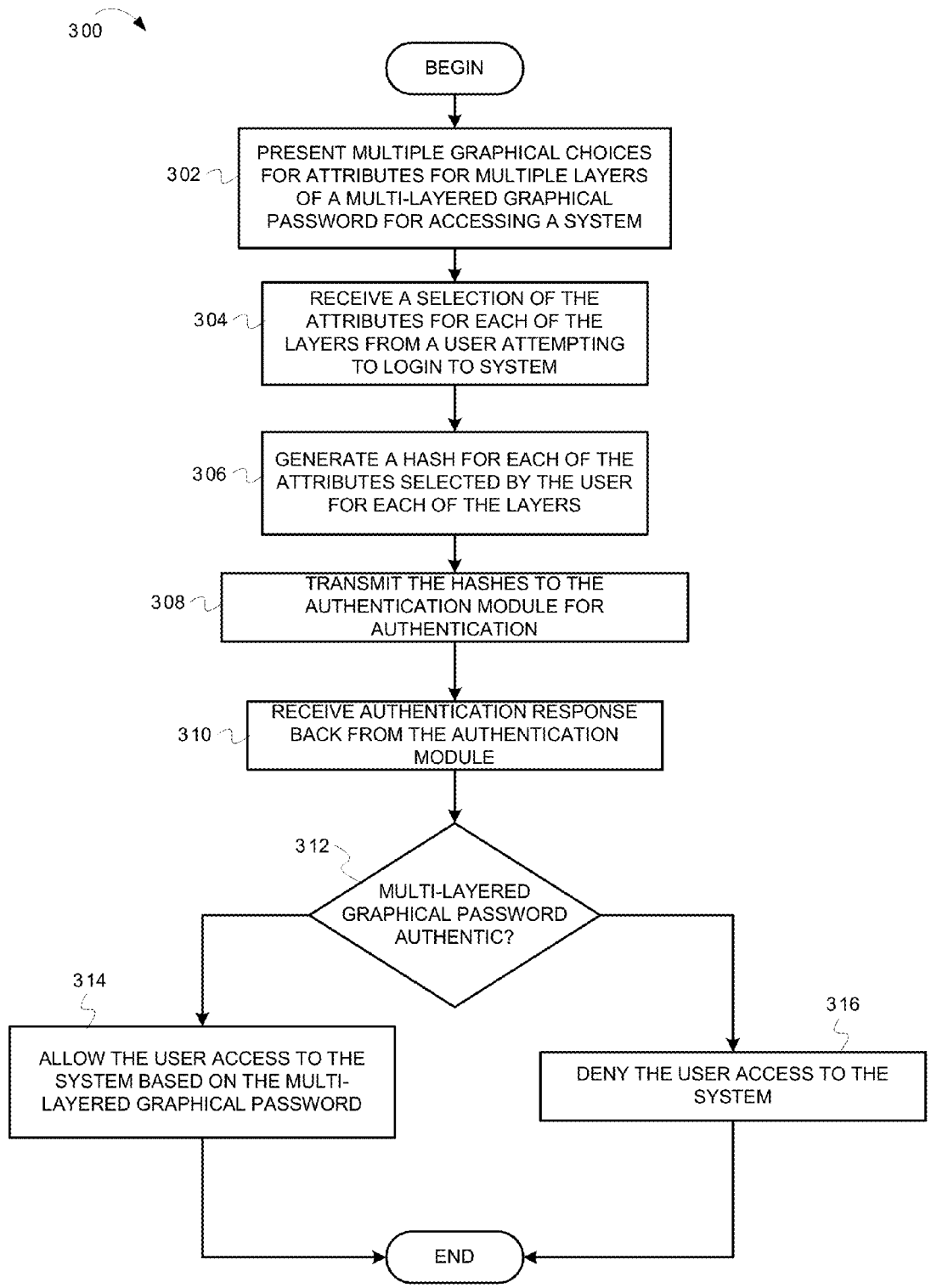
FIG. 3 is a flowchart of operations for presenting a multiple of choices for user selection for each attribute in a layer of a multi-layered graphical password, according to some example embodiments.
Figure 4:
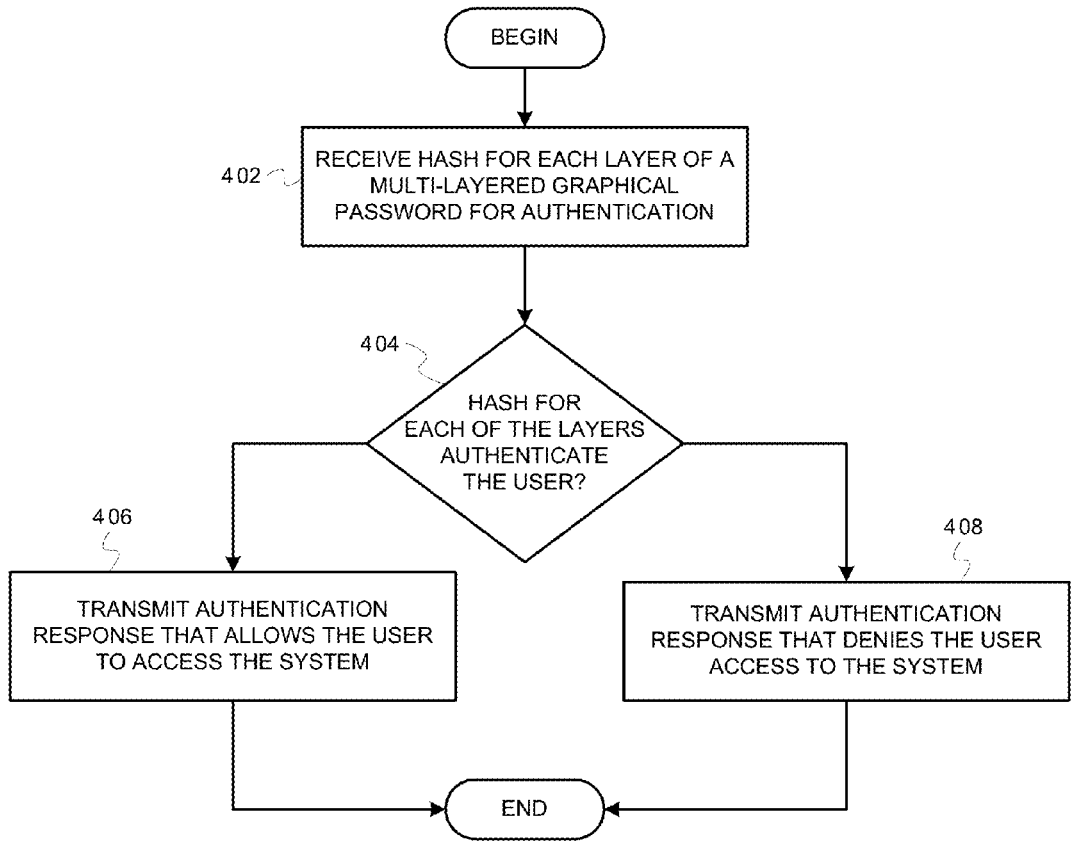
FIG. 4 is a flowchart of operations for authenticating a multi-layered graphical password, according to some example embodiments.

FIG. 3 is a flowchart of operations for presenting a multiple of choices for user selection for each attribute in a layer of a multi-layered graphical password, according to some example embodiments. The operations of the flowchart 300 begin at block 302.

At block 302, the password module 105 presents multiple choices for a number of attributes for multiple layers of a multi-layered graphical password for accessing a system by a user. For example, this presentation can be in response to selection, by a user, of a physical button or graphical button on a graphical user interface, powering on the system, etc. With reference to a wagering game machine, this presentation can be in response to a wagering game player providing certain inputs to cause the password module 105 executing on the wagering game machine to present a login screen that includes the multiple choices. With reference to FIG. 1, the attributes of the multi-layered graphical password can comprise a background color, an image, an image color, an image option, etc. For each attribute, the password module 105 presents multiple choices. For the example of FIG. 1, the password module 105 presents 16 different choices for the background color, 5 choices for the image, 16 different choices for the image color, and 5 different choices for the image option. As described above, the password module 105 can present the choices on palettes. Also, the password module 105 can present all of the palettes at once on a same screen for the user. Alternatively, the password module 105 can present the palettes on different screens. For example, the password module 105 can present the multiple choices for a first attribute on one screen. After the user selection for the first attribute, the password module 105 can present the multiple choices for a second attribute on a second screen, etc. Alternatively, the password module 105 can present related palettes on a same screen. For example, if the multi-layered graphical password comprises multiple images that include a color and an option, the password module 105 can present the palette for selection of the first image, the palette for the selection of the first image color, and the palette for the selection of a first image option on a same screen. The operations of the flowchart 300 continue at block 304.

At block 304, the password module 105 receives a selection of the attributes for each of the layers of the multi-layered graphical password from a user attempting to login to the system. With reference to FIG. 1, the password module 105 receives a selection for the background color (the first layer 186), the image (the first and second layers 187), the image color (the first, second and third layers 188), the image option (the first, second, third and fourth layers 189). The user 185 can make their selection among the multiple of choices on a palette using a button selection. For example, physical button can be associated with the choices for a palette. Alternatively or in addition, the display monitor 104 can be a touch screen, wherein the user 185 can select a choice by touching the part of the screen displaying their choice. In some example embodiments, the user 185 can also select using a keyboard, mouse, etc. The operations of the flowchart 300 continue at block 306.

At block 306, the password module 105 generates a hash for each of the attributes selected by the user for each of the layers of the multi-layered graphical password. As described above, in some other example embodiments, the password module 105 can create a single hash for all attributes or any other type of representations of the selected attributes. The password module 105 can use any of a number of different hash functions to create the hashes. The hashes can be cryptographic or non-cryptographic. Examples of hash functions include Message Digest (MD)-4, MD-5, Secure Hash Algorithm (SHA)-1, SHA-2, Zobrist, Pearson, etc. In some example embodiments, the password module 105 concatenates the hashes together to create a single hash that is provided to the authentication module 183. The operations of the flowchart 300 continue at block 308.

At block 308, the password module 105 transmits the hashes to the authentication module for authentication. With reference to FIGS. 1-2, the password module 105 transmits the hashes to the authentication module 183. As described above, the password module 105 and the authentication module 183 can be on a same or different computer. With reference to FIG. 2, the password module 105 transmits the hashes to the authentication module 183 over the network 206. If the two modules were processes executing on a same computer, the password module 105 can transmit the hashes to the authentication module 183 using some type of inter-process communication. The operations continue at block 310.

At block 310, the password module 105 receives an authentication response back from the authentication module. With reference to FIGS. 1-2, the password module 105 waits for the authentication module 183 to authenticate the multi-layered graphical password using the received hashes and to provide an authentication response. A more detailed description of the operations of the authentication module 183 is set forth below in reference to FIG. 4. The operations of the flowchart 300 continue at block 312.

At block 312, the password module 105 determines whether the multi-layered graphical password is authenticate based on the authentication response from the authentication module. For example, the authentication module 183 can provide a Boolean value that indicates whether the password is valid or invalid. If the multi-layered graphical password is authentic, the operations of the flowchart 300 continue at block 314. Otherwise, the operations of the flowchart 300 continue at block 316.

At block 314, the password module 105 allows the user access to the system based on the multi-layered graphical password. For example if allowed access for a wagering game machine, the wagering game player would be logged into their account to provide for player tracking, reward points, etc. based on their wagering game play. For online access, the user can then be able to access their account, certain pages associated with the website, etc. The operations of the flowchart 300 are complete.

At block 316, the password module 105 denies the user access to the system. The password module 105 can display an error message, allow the user to retry logging in a limited number of times, etc. The operations of the flowchart 300 are complete.

The operations of authentication of a multi-layered graphical password, in accordance with some example embodiments, are now described. In particular, FIG. 4 is a flowchart of operations for authenticating a multi-layered graphical password, according to some example embodiments. The operations of the flowchart 400 begin at block 402.

At block 402, the authentication module 183 receives a hash for each layer of a multi-layered graphical password for authentication. With reference to FIG. 1, the password module 105 receives a selection of different attributes associated with different layers of the multi-layered graphical password 190. As described above, the password module 105 can create a hash for each layer and then can concatenate the hashes together. The password module 105 transmits the hash for each layer to the authentication module 183. The operations of the flowchart 400 continue at block 404.

At block 404, the authentication module 183 determines whether the hash for each of the layers authenticates the user. As described above, for a concatenated hash representation, the authentication module 183 can parse out each hash. The authentication module 183 can then compare each hash to a correct hash representation for each attribute. In particular, the authentication module 183 can create these correct hashes when a user initially creates or updates their password. The authentication module 183 can store these correct hash representations for each of these attributes. The authentication module 183 can compare these stored hash representations to the parsed out hashes derived from the hash received from the password module 105. If all of the stored hashes equal their respective hashes received from the password module 105, the authentication module 183 defines the user login as valid. Otherwise if at least one of the stored hashes does not equal their respective hash received from the password module 105, the authentication module 183 defines the user login as invalid. If the user login is considered valid, the operations of the flowchart 400 continue at block 406. Otherwise, the operations of the flowchart 400 continue at block 408.

At block 406, the authentication module 183 transmits an authentication response that allows the user to access the system. For example, the authentication module 183 can transmit a Boolean value that indicates the user login is valid back to the password module 105. The operations of the flowchart 400 are complete.

At block 408, the authentication module 183 transmits an authentication response that denies the user access to the system. For example, the authentication module 183 can transmit a Boolean value that indicates the user login is invalid back to the password module 105. The operations of the flowchart 400 are complete.

Application to a Wagering Game Environment

In some example embodiments, user authentication having multi-layered graphical passwords can be incorporated into various wagering game environments. The following section provides an example wagering game architecture, network and wagering game machines that can incorporate user authentication having a multi-layered graphical password.

Some example embodiments can be used in adaptive gaming for wagering game environments. In adaptive gaming, the wagering game system performs user tracking across different wagering game machines. For adaptive gaming, a user logs in to different wagering game machines to enable user tracking. Accordingly, This multi-layered graphical password authentication can replace total rewards cards that rewards players based on their gaming. Therefore, the players would not be required to carry these total rewards cards. Also, the multi-layered graphical passwords can be using as a singular player account that can be used to login to a number of different wagering game machines. Some example embodiments minimize the amount of personal information required from a user. In particular, a user may be inputting selections of attributes to create the multi-layered graphical password for user authentication. This minimizing of personal information can encourage wagering game players to sign up for player tracking and total rewards. Some example embodiments can also be used for online access for wagering game activities. For example, some example embodiments can be used for accessing an online account for websites that provide player tracking and total rewards for wagering game activity. Some example embodiments can also be used for accessing an account for an online wagering game website where wagering game activity can occur.

Wagering Game Machine Architectures

Figure 5:
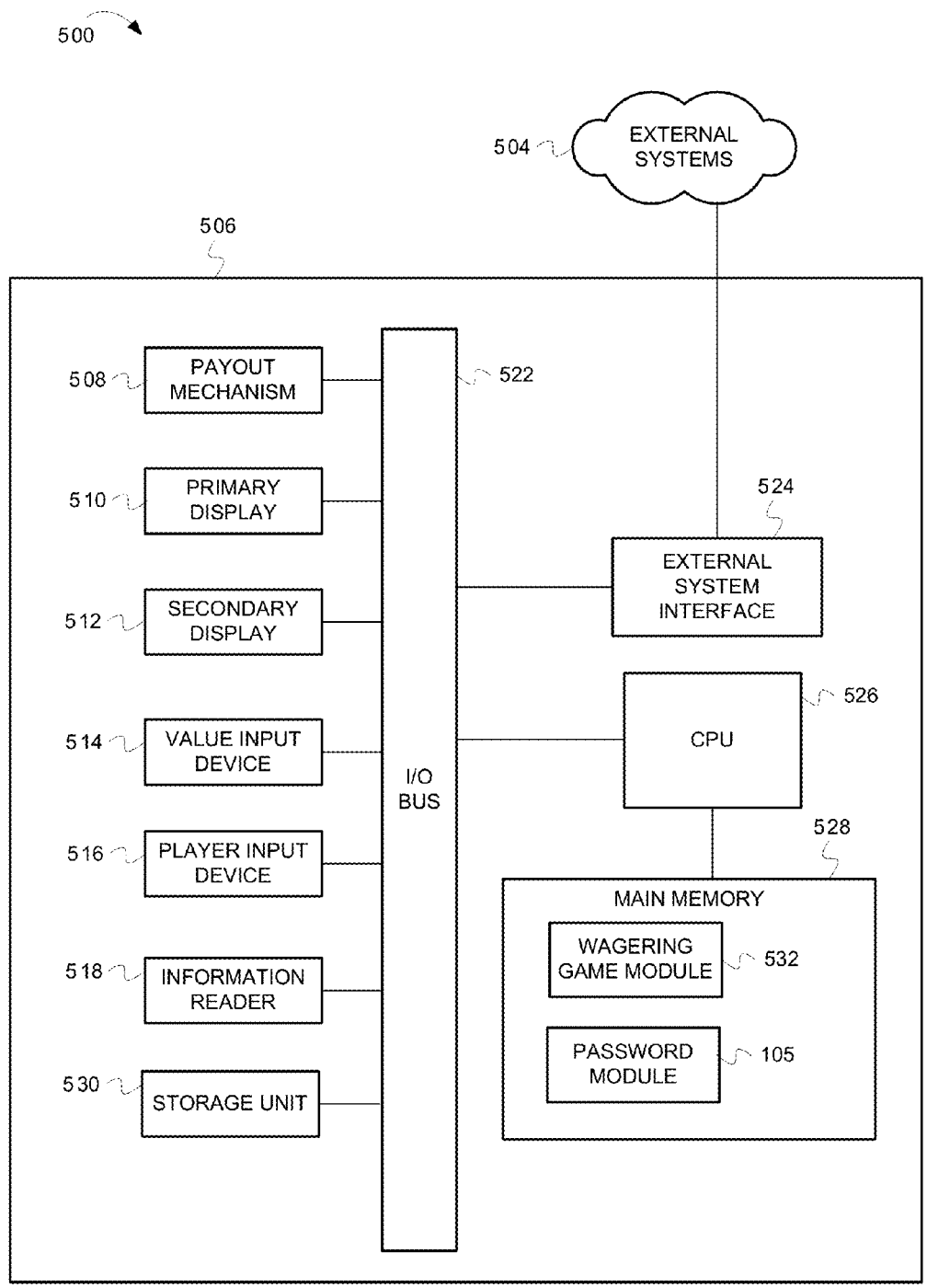
FIG. 5 is a block diagram illustrating a wagering game machine architecture, according to some example embodiments.

FIG. 5 is a block diagram illustrating a wagering game machine architecture, according to some example embodiments. As shown in FIG. 5, the wagering game machine architecture 500 includes a wagering game machine 506, which includes a central processing unit (CPU) 526 connected to main memory 528. The CPU 526 can include any suitable processor, such as an Intel® Pentium processor, Intel® Core 2 Duo processor, AMD Opteron™ processor, or UltraSPARC processor. The main memory 528 includes a wagering game module 532 and a password module 533. The password module 105 can perform the operations described herein. In some example embodiments, the main memory 528 can also include the authentication module 183 (as described above). Alternatively, the authentication module is within a backend server (see description of FIG. 2 above). In one embodiment, the wagering game module 532 can present wagering games, such as video poker, video black jack, video slots, video lottery, etc., in whole or part.

The CPU 526 is also connected to an input/output (I/O) bus 522, which can include any suitable bus technologies, such as an AGTL+ frontside bus and a PCI backside bus. The I/O bus 522 is connected to a payout mechanism 508, primary display 510, secondary display 512, value input device 514, player input device 516, information reader 518, and storage unit 530. The player input device 516 can include the value input device 514 to the extent the player input device 516 is used to place wagers. The I/O bus 522 is also connected to an external system interface 524, which is connected to external systems 504 (e.g., wagering game networks).

In one embodiment, the wagering game machine 506 can include additional peripheral devices and/or more than one of each component shown in FIG. 5. For example, in one embodiment, the wagering game machine 506 can include multiple external system interfaces 524 and/or multiple CPUs 526. In one embodiment, any of the components can be integrated or subdivided.

Any component of the architecture 500 can include hardware, firmware, and/or machine-readable media including instructions for performing the operations described herein. Machine-readable media includes any mechanism that provides (i.e., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory machines, etc. Machine-readable media also includes any media suitable for transmitting software over a network.

Wagering Game Networks

Some example embodiments can be used in a network configuration for wagering game play. In this example, a wagering game server can be considered the backend server that is communicatively coupled to wagering game machines. In such an application, the password module 105 can be executing in one or more of the wagering game machines, and the authentication module 183 can be executing in the wagering game server.

Figure 6:
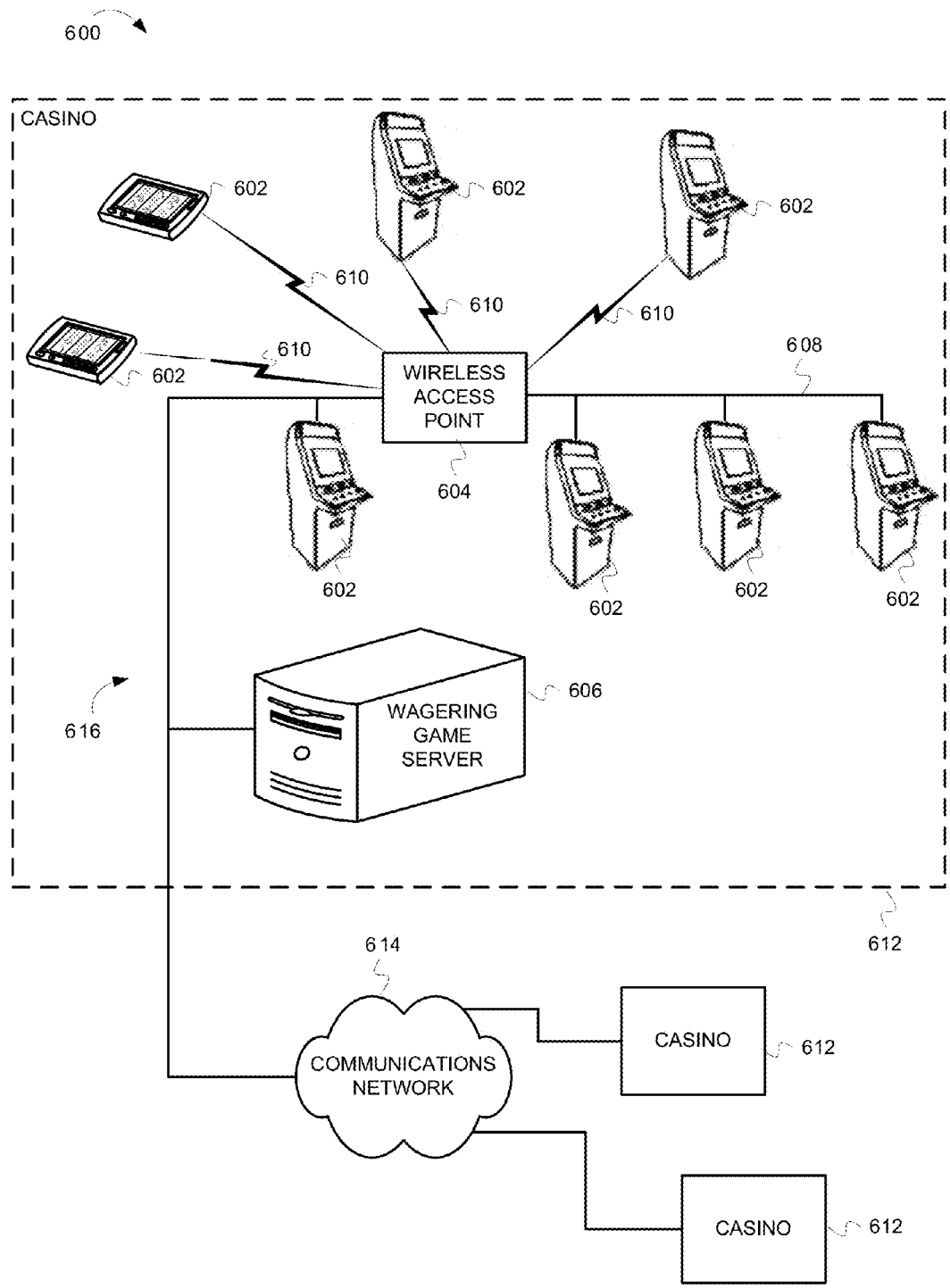
FIG. 6 is a block diagram illustrating a wagering game network, according to some example embodiments.

FIG. 6 is a block diagram illustrating a wagering game network, according to some example embodiments. As shown in FIG. 6, the wagering game network 600 includes a plurality of casinos 612 connected to a communications network 614.

Each casino 612 includes a local area network 616, which includes an access point 604, a wagering game server 606, and wagering game machines 602. The access point 604 provides wireless communication links 610 and wired communication links 608. The wired and wireless communication links can employ any suitable connection technology, such as Bluetooth, 802.11, Ethernet, public switched telephone networks, SONET, etc. In some embodiments, the wagering game server 606 can serve wagering games and distribute content to devices located in other casinos 612 or at other locations on the communications network 614. In some example embodiments, the authentication module 183 is executing in the wagering game server 606.

The wagering game machines 602 described herein can take any suitable form, such as floor standing models, hand-held mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

In some embodiments, wagering game machines 602 and wagering game servers 606 work together such that a wagering game machine 602 can be operated as a thin, thick, or intermediate client. For example, one or more elements of game play may be controlled by the wagering game machine 602 (client) or the wagering game server 606 (server). Game play elements can include executable game code, lookup tables, configuration files, game outcome, audio or visual representations of the game, game assets or the like. In a thin-client example, the wagering game server 606 can perform functions such as determining game outcome or managing assets, while the wagering game machine 602 can present a graphical representation of such outcome or asset modification to the user (e.g., player). In a thick-client example, the wagering game machines 602 can determine game outcomes and communicate the outcomes to the wagering game server 606 for recording or managing a player's account.

In some embodiments, either the wagering game machines 602 (client) or the wagering game server 606 can provide functionality that is not directly related to game play. For example, account transactions and account rules may be managed centrally (e.g., by the wagering game server 606) or locally (e.g., by the wagering game machine 602). Other functionality not directly related to game play may include power management, presentation of advertising, software or firmware updates, system quality or security checks, etc.

Any of the wagering game network components (e.g., the wagering game machines 602) can include hardware and machine-readable media including instructions for performing the operations described herein.

Example Wagering Game Machine

Figure 7:
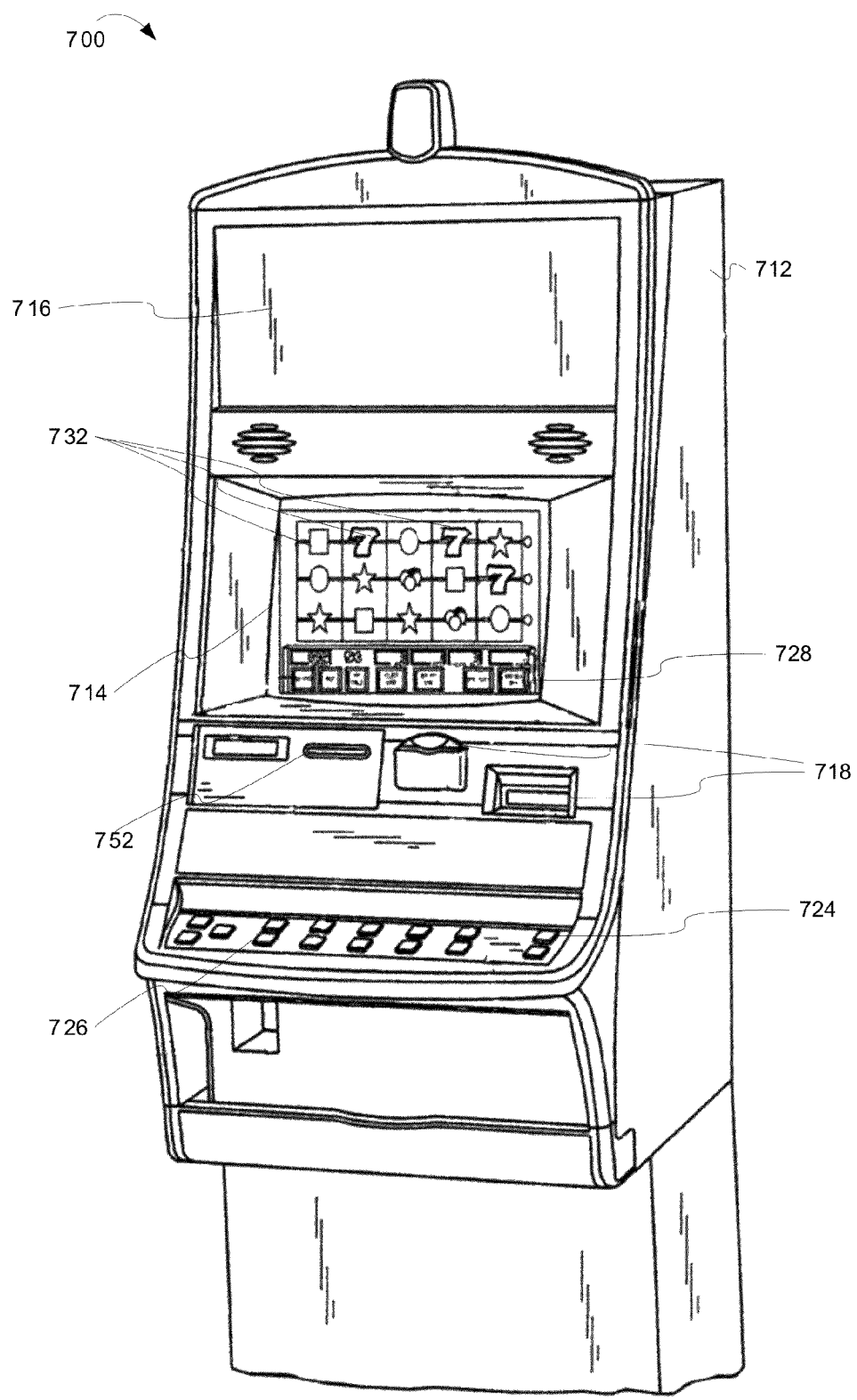
FIG. 7 is a perspective view of a wagering game machine, according to some example embodiments.

FIG. 7 illustrates an example wagering game machine, wherein a wagering game player can login into their account for player tracking, rewards, etc. based on their wagering game play, wherein the login includes a multi-layered graphical password. In particular, FIG. 7 is a perspective view of a wagering game machine, according to some example embodiments. Referring to FIG. 7, a wagering game machine 700 is used in gaming establishments, such as casinos. According to embodiments, the wagering game machine 700 can be any type of wagering game machine and can have varying structures and methods of operation. For example, the wagering game machine 700 can be an electromechanical wagering game machine configured to play mechanical slots, or it can be an electronic wagering game machine configured to play video casino games, such as blackjack, slots, keno, poker, blackjack, roulette, etc.

The wagering game machine 700 comprises a housing 712 and includes input devices, including value input devices 718 and a player input device 724. For output, the wagering game machine 700 includes a primary display 714 for displaying information about a basic wagering game. The primary display 714 can also display information about a bonus wagering game and a progressive wagering game. The wagering game machine 700 also includes a secondary display 716 for displaying wagering game events, wagering game outcomes, and/or signage information. While some components of the wagering game machine 700 are described herein, numerous other elements can exist and can be used in any number or combination to create varying forms of the wagering game machine 700.

The value input devices 718 can take any suitable form and can be located on the front of the housing 712. The value input devices 718 can receive currency and/or credits inserted by a player. The value input devices 718 can include coin acceptors for receiving coin currency and bill acceptors for receiving paper currency. Furthermore, the value input devices 718 can include ticket readers or barcode scanners for reading information stored on vouchers, cards, or other tangible portable storage devices. The vouchers or cards can authorize access to central accounts, which can transfer money to the wagering game machine 700.

The player input device 724 comprises a plurality of push buttons on a button panel 726 for operating the wagering game machine 700. In addition, or alternatively, the player input device 724 can comprise a touch screen 728 mounted over the primary display 714 and/or secondary display 716.

The various components of the wagering game machine 700 can be connected directly to, or contained within, the housing 712. Alternatively, some of the wagering game machine's components can be located outside of the housing 712, while being communicatively coupled with the wagering game machine 700 using any suitable wired or wireless communication technology.

The operation of the basic wagering game can be displayed to the player on the primary display 714. The primary display 714 can also display a bonus game associated with the basic wagering game. The primary display 714 can include a cathode ray tube (CRT), a high resolution liquid crystal display (LCD), a plasma display, light emitting diodes (LEDs), or any other type of display suitable for use in the wagering game machine 700. Alternatively, the primary display 714 can include a number of mechanical reels to display the outcome. In FIG. 7, the wagering game machine 700 is an "upright" version in which the primary display 714 is oriented vertically relative to the player. Alternatively, the wagering game machine can be a "slant-top" version in which the primary display 714 is slanted at about a thirty-degree angle toward the player of the wagering game machine 700. In yet another embodiment, the wagering game machine 700 can exhibit any suitable form factor, such as a free standing model, bartop model, mobile handheld model, or workstation console model.

A player begins playing a basic wagering game by making a wager via the value input device 718. The player can initiate play by using the player input device's buttons or touch screen 728. The basic game can include arranging a plurality of symbols along a payline 732, which indicates one or more outcomes of the basic game. Such outcomes can be randomly selected in response to player input. At least one of the outcomes, which can include any variation or combination of symbols, can trigger a bonus game.

In some embodiments, the wagering game machine 700 can also include an information reader 752, which can include a card reader, ticket reader, bar code scanner, RFID transceiver, or computer readable storage medium interface. In some embodiments, the information reader 752 can be used to award complimentary services, restore game assets, track player habits, etc.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A computerized method comprising:
   presenting, by one or more central processing units (CPUs), multiple choices for attributes of a multi-layered graphical password, wherein each of the attributes is associated with one of a plurality of layers of the multi-layered graphical password, wherein the multi-layered graphical password is for use in accessing a system, and wherein the presenting includes at least one of randomly ordering the attributes in a display area and randomly locating, in the display area, the multiple choices for the attributes;
   receiving selections from among the multiple choices, wherein the selections identify a group of the attributes of the multi-layered graphical password, and wherein the selections are associated with a user attempting access to the system;
   creating a single image representing the multi-layered graphical password in accordance with the selected group of attributes;
   authenticating the user based on the group of the attributes of the multi-layered graphical password; and
   allowing the user access to the system.

2. The computerized method of claim 1, wherein the attributes comprise at least one of a background color for the multi-layered graphical password, an image for the multi-layered graphical password, a color for the image for the multi-layered graphical password and an image attribute for the image for the multi-layered graphical password.

3. The computerized method of claim 1, wherein the system comprises a wagering game machine.

4. The computerized method of claim 3, wherein the user comprises a player that is to play a wagering game on the wagering game machine after authenticating the player based on each of the multiple of layers of the multi-layered graphical password.

5. The computerized method of claim 1, further comprising:
   generating a hash for each of the attributes for each of the multiple layers of the multi-layered graphical password, and wherein the authenticating is based on the hash for the attributes for each of the multiple layers of the multi-layered graphical password.

6. One or more non-transitory machine-readable storage media including instructions which, when executed by one or more processors, cause the one or more processors to perform operations comprising:
receiving a first request to login to a system, wherein the request is associated with a user;
performing the following operations, in response to the first request,
presenting a first group of choices for each of a number of attributes of a multi-layered graphical password, wherein the multi-layered graphical password is for use in logging-in the user into the system, wherein each of the number of attributes are associated with one of a plurality of layers of the multi-layered graphical password, and wherein the first group of choices is in a randomly determined first order, and wherein the presenting includes randomly locating, in a display area, the first group of choices for the number of attributes;
receiving user input indicating first selections from among the first group of choices for each of the number of attributes of the multi-layered graphical password, wherein the first selections identify a first group of selected attributes;
create a single image representing the multi-layered graphical password in accordance with the first group of selected attributes;
determining that the first group of selected attributes match stored attributes associated with the user; and
allowing the user access to the system, in response to the determining that the first group of selected attributes match stored attributes associated with the user.

7. The one or more non-transitory machine-readable storage media of claim 6, the operations further comprising:
receiving user input indicating a second request to login to the system; and
performing the following operations, in response to the second request,
presenting a second group of choices for each of the number of attributes of the multi-layered graphical password, wherein each of the number of attributes is associated with one of the plurality of layers of the multi-layered graphical password, and wherein the second group of choices is in a randomly determined second order that is different from the first order;
receiving user input indicating second selections from among the second group of choices for each of the number of attributes of the multi-layered graphical password, wherein the second selections identify a second group of selected attributes;
determining that the second group of selected attributes match the stored attributes associated with the user; and
allowing the user access to the system.

8. An apparatus comprising:
a CPU;
a password module, executable on the CPU, configured to,
present multiple choices for attributes of a multi-layered graphical password, wherein each of the attributes are associated with one of a multiple of layers of the multi-layered graphical password used to access the apparatus, wherein the presentation includes at least one of a random ordering of the attributes for each of the multiple of layers of the multi-layered graphical password and random location of the multiple choices for the attributes for at least one of the multiple layers of the multi-layered graphical password; and
receive selections from among the multiple choices for each of the attributes of the multi-layered graphical password, from a user that is attempting to login to the apparatus;
create a single image representing the multi-layered graphical password in accordance with the selections; and
an authentication module, executable on the CPU, configured to authenticate the user to enable access of the apparatus in response to the selections being correct for each of the attributes of the multi-layered graphical password.

9. The apparatus of claim 8, wherein the apparatus comprises a wagering game machine and the user is a wagering game player, wherein the apparatus further comprises a wagering game module, executable on the CPU, configured to present a wagering game on which monetary value can be wagered to the wagering game player, after the user has been authenticated for access.

10. The apparatus of claim 8, wherein the attributes comprise at least one of a background color for the multi-layered graphical password, an image for the multi-layered graphical password, a color for the image for the multi-layered graphical password and an image attribute for the image for the multi-layered graphical password.

11. A system comprising:
an apparatus comprising,
a first CPU; and
a password module, executable on the first CPU, configured to, receive, from a user, a first request to login to a system;
present multiple choices for each of a number of attributes of a multi-layered graphical password that is used to login the user into the system, wherein each of the number of attributes are associated with one of a multiple of layers of the multi-layered graphical password, wherein the presentation includes at least one of a random ordering of the number of attributes for each of the multiple of layers of the multi-layered graphical password and random location of the multiple choices for the attributes for at least one of the multiple layers of the multi-layered graphical password;
receive, from the user, selections from among the multiple choices for each of the number of attributes of the multi-layered graphical password;
create a single image representing the multi-layered graphical password in accordance with the selections;
generate a hash for each of the selections for each of the number of attributes of the multi-layered graphical password;
transmit the hash for each of the selections over a network for authentication;
a server communicatively coupled to the apparatus through the network, the server comprising,
a second CPU; and
an authentication module, executable on the second CPU, configured to,
receive the hash for each of the selections over the network from the password module;
determine whether the hash for each of the selections is correct; and
transmit a response, to allow the user to access the apparatus, back to the password module over the network, responsive to a determination that the hash for each of the selections is correct.

12. An apparatus comprising:

means for presenting multiple choices for attributes of a multi-layered graphical password, wherein each of the attributes are associated with one of a multiple of layers of the multi-layered graphical password used to access a system, and wherein the means for presenting includes at least one of means for randomly ordering the attributes in a display area and means for randomly locating, in the display area, the multiple choices for the attributes;

means for receiving selections from among the multiple choices for each of the attributes of the multi-layered graphical password, from a user that is attempting to login to the system;

means for creating a single image representing the multi-layered graphical password in accordance with the selections for each of the attributes; and means for authenticating the user to enable access of the system based on the selections for each of the attributes of the multi-layered graphical password.

13. The apparatus of claim 12, wherein the attributes comprise at least one of a background color for the multi-layered graphical password, an image for the multi-layered graphical password, a color for the image for the multi-layered graphical password and an image attribute for the image for the multi-layered graphical password.

14. The apparatus of claim 12, further comprising:

means for generating a hash for each of the attributes for each of the multiple layers of the multi-layered graphical password, wherein the authenticating of the user is based on the hash for the attributes for each of the multiple layers of the multi-layered graphical password.

15. The one or more non-transitory machine-readable storage media of claim 6, wherein presenting the first group of choices for each of the number of attributes of the multi-layered graphical password includes presenting a first subset of the first group of choices in a first palette associated with a first layer of the multi-layered graphical password and presenting a second subset of the first group of choices in a second palette associated with a second layer of the multi-layered graphical password.

16. The one or more non-transitory machine-readable storage media of claim 15, wherein presenting the second subset of the first group of choices includes presenting the second subset based, at least in part, on a selection from the first palette.

\* \* \* \* \*